UNITED STATES PATENT OFFICE.

MALCOLM McDOWELL, OF CHICAGO, ILLINOIS, ASSIGNOR, BY MESNE ASSIGNMENTS, TO THE FORT DEARBORN IRON COMPANY, OF SAME PLACE.

TREATMENT OF SCRAP IRON OR STEEL.

SPECIFICATION forming part of Letters Patent No. 644,719, dated March 6, 1900.

Application filed October 28, 1896. Serial No. 610,262. (No specimens.)

*To all whom it may concern:*

Be it known that I, MALCOLM McDOWELL, a citizen of the United States of America, residing at Chicago, in the county of Cook and State of Illinois, have invented a certain new and useful Process in the Treatment of Scrap Iron or Steel, of which the following is a description.

In the treatment of scrap iron or steel to reclaim it for further use it is desirable, in order to assure the best results, that each and every part or portion of the mass shall be subjected to a similar treatment and to an equal extent, the object being to so treat the scrap that it will result in a homogeneous mass of a uniform nature, which will be an average of the nature of all the individual pieces going to make up the entire charge.

My invention has in view the above desirable objects; and to this end it consists in the various steps hereinafter described.

In thus treating scrap iron or steel I first reduce it to small pieces by cutting or breaking it up. I then preferably carefully divide it into grades, depending upon the size of each piece, and in such cases prefer to treat each grade separately for the reasons hereinafter described. By using the term "cutting or breaking it up" I wish to be understood to say that I reduce the scrap to small pieces. Obviously when the scrap is already in such small pieces the cutting or breaking will be unnecessary. The scrap is then placed in a tumbling-box and tumbled to clean it by removing as much of the dirt and the oxids (black and red) as is possible by that process. In this step I also prefer to introduce a blast of sand into the box through the hollow journal of the same to aid in thoroughly cleaning the scrap. I then select a sufficient quantity of the cut and cleaned material for a satisfactory charge—say from twelve hundred to fifteen hundred pounds—and charge it, together with a proportionate amount of a flux which fuses at a low temperature, into a rotary heating and welding furnace. Sufficient heat is then applied to reduce the flux to a liquid form, and as the scrap is rolled over by the rotary motion of the furnace, which motion carries it well up the sides, allowing it to fall back into the flux, it becomes enveloped with the same, protecting it from oxidation. The furnace heat is then gradually raised to the highest point necessary to insure the equalization of all the inequalities existing by reason of the individual nature of each piece of scrap composing the charge under treatment. For the reason that the material charged in the furnace has been thoroughly cleaned of its dirt and especially from the oxids that enveloped it the charge of scrap will, at a comparatively-moderate temperature, become welded into a mass ordinarily by first intent, the flux enveloping it protecting it while it is being brought to a uniform nature, as before stated. This is made manifest when the resulting ball has been subjected to pressure by being passed through a squeezer or under a hammer by its emerging a solid homogeneous bloom or billet of metal. From this point the bloom or billet may be handled in the same manner as when produced by other processes.

By dividing the scrap into grades depending upon the size of the individual pieces, as before mentioned, it is clear that the process may be more uniformly conducted throughout. The heat may be more uniformly regulated to treat the entire mass, and each piece will require and receive substantially the same treatment and degree of heat to reduce it to a proper welding condition, thus lessening any liability that might exist that the bloom might not be of a uniform quality or nature throughout.

By cleaning the scrap of dirt and the oxids, as described, it can be brought to a welding condition at a much lower temperature, while by enveloping each piece in the flux I am enabled to raise the furnace heat to the highest temperature necessary to secure perfect results without material loss or waste of the iron and at the same time neutralize the inequalities and differences of nature that may be in the mass in the furnace.

The action of the furnace by its rotary motion becomes a mechanical baller, at the same time submitting the mass to the full and complete effects of the molten flux, as described, the flux used depending upon whether it is desired to produce a bloom or billet of iron or of steel. If the bloom is to be of iron, I prefer to use the decarbonizing flux of ferro-silicate of manganese. If the bloom is to be of steel, I prefer to use the carbonizing flux of ferrocarbureted silicon and manganese. In either case the action of carbonizing or decarbonizing may also be materially aided by using a carbonized flame or an oxidized flame to heat the furnace. The degree to which the carbonizing or decarbonizing shall be carried always depends upon whether the charge is of scrap iron or of steel. Consequently the percentage of flux used may vary slightly. I have, however, secured very good results in a charge of scrap of twelve hundred and fifty pounds by using substantially ten per cent., by weight, of the flux—that is to say, substantially one hundred and twenty-five pounds; but I do not limit myself to an exact quantity of the flux, as it will necessarily vary somewhat, as stated.

In all cases the produce will be a solid homogeneous bloom of metal of a uniform quality throughout.

Having thus described my invention, what I claim as new, and desire to secure by Letters Patent, is—

1. The herein-described process of treating scrap iron or steel, consisting in first reducing the scrap to small pieces, then freeing the same from dirt and oxids, then charging the cleaned scrap together with a flux into a heating and welding furnace and so manipulating the same that the charge will be alternately plunged into and lifted from the flux, preventing rapid oxidation, meanwhile subjecting the same to a temperature sufficiently high to reduce it to a homogeneous mass or ball, and then removing the ball and subjecting it to pressure by squeezing or hammering to produce a bloom or billet, substantially as described.

2. The herein-described process of treating scrap iron or steel, consisting in first reducing the scrap to small pieces, then freeing the same from dirt and oxids, then separating the scrap into grades dependent upon the size of piece, and treating each grade separately by charging a suitable quantity of the same together with a flux into a heating and welding furnace and so manipulating the same that the charge will be alternately plunged into and lifted from the flux, preventing rapid oxidation, meanwhile subjecting the same to a temperature sufficiently high to reduce it to a homogeneous mass or ball, and then removing the ball and subjecting it to pressure by squeezing or hammering to produce a bloom or billet, substantially as described.

3. The herein-described process of treating scrap iron or steel, consisting in first reducing the scrap to small pieces and freeing the same from dirt and oxids, then separating the same into grades dependent upon the size of piece and treating each grade separately by charging a suitable quantity of the same together with a flux into a heating and welding furnace and so manipulating the charge that the pieces will become alternately submerged in the flux and then removed therefrom, meanwhile subjecting the charge to a rising temperature sufficient to reduce it to a homogeneous mass or ball, and then removing the ball and subjecting it to a pressure by squeezing or hammering to produce a bloom or billet, substantially as described.

MALCOLM McDOWELL.

Witnesses:
L. A. GARDINER,
JOHN W. HILL.